(12) United States Patent
Marty et al.

(10) Patent No.: US 6,904,392 B1
(45) Date of Patent: Jun. 7, 2005

(54) ANNOTATION MANAGEMENT

(75) Inventors: Jean-Claude Marty, Castanet (FR); Dominique Gaunet, Alleé Bul Bezanne (FR)

(73) Assignee: Dassault Systemes (FR)

( * ) Notice: Subject to any disclaimer, the term of this patent is extended or adjusted under 35 U.S.C. 154(b) by 701 days.

(21) Appl. No.: 09/687,533

(22) Filed: Oct. 13, 2000

(51) Int. Cl.$^7$ .............................................. G06F 17/50
(52) U.S. Cl. ................................ 703/1; 703/7; 703/22; 700/97; 345/651; 345/662; 345/677; 715/512
(58) Field of Search .............................. 703/1–2, 7, 22; 700/97; 345/419, 651, 662, 677; 715/512

(56) References Cited

U.S. PATENT DOCUMENTS

| | | | |
|---|---|---|---|
| 5,506,948 A | * | 4/1996 | Onitake et al. ............. 345/619 |
| 5,526,478 A | | 6/1996 | Russell, Jr. et al. ......... 715/512 |
| 5,572,639 A | * | 11/1996 | Gantt ......................... 345/651 |
| 5,701,403 A | | 12/1997 | Watanabe et al. ........... 345/419 |
| 6,611,725 B1 | * | 8/2003 | Harrison et al. ............. 700/98 |

OTHER PUBLICATIONS

Goldberg, "Customizing Annotations, and Predictions for the Future," CADalyst, vol. 17 No. 3, pp. 66–68 (Mar. 2000).*

Hutton et al, "A Strategy for On–line Interpretation of Sketched Engineering Drawings," IEEE Proceedings of the Fourth International Conference on Document Analysis and Recognition, vol. 2, pp. 771–775 (Aug. 1997).*

Lieberman, "Graphical Annotation as a Visual Language for Specifying Generalization Relations," Proceedings of the 1993 Symposium on Visual Languages, pp. 19–24 (Aug. 1993).*

Vivier et al, "Annotator: An AI Approach to Engineering Drawing Annotation," ACM Proceedings of the First International Conference on Industrial and Engineering Applications of Artificial Intelligence and Expert Systems, vol. 1, pp. 447–455 (1988).*

R.B., Fredricks, D.A., Intersection of parametric surfaces and a plane, Computer Graphics and Applications, Aug. 1984, pp. 48–51.

R. E. Barnhill, S. N. Kersey; A marching method for parametric surface/surface intersection, Computer Aided Geometric Design, v.7 n.1–4, p. 257–280, Jun. 1990.

Hanna, S.L., Abel, J.F., and Greenberg, D.P., Intersection of parametric surfaces by means of lookup tables, Computer Graphics and Applications, 1983, vol. 3, No. 7.

Houghton, E.G., Emnett, R.F., Factor, J.D., and Sabharwal, C.L., Implementation of a divide–and–conquer method for intersection of parametric surface, Computer Aided Geometric Design, 1985, vol. 2.

Nicholas M. Patrikalakis, Surface–to–Surface Intersections, IEEE Computer Graphics and Applications, v.13 n.1, p. 89–95, Jan. 1993.

European Communication for EP Application No. 01402579.5 dated Apr. 20, 2004.

* cited by examiner

*Primary Examiner*—Samuel Broda
(74) *Attorney, Agent, or Firm*—James V. Mahon; Clifford Chance US LLP

(57) ABSTRACT

In CAD/CAM/CAE/PDM systems in which three dimensional objects are display along with two dimensional annotations, a method and system is described for assisting the user in selecting a location for placement of the annotation on the object so that it annotates the proper portion of the object and complies with applicable standards. The system displays through highlighting or other visual means a set of points on the object to which the leader line of an annotation may be connected so that the annotation meets the requirements of applicable standards. The user may select any one of the location points.

20 Claims, 10 Drawing Sheets

ANNOTATION MANAGEMENT

BACKGROUND

The present invention relates to the field of computer-aided design (CAD), computer aided manufacturing (CAM), computer aided engineering (CAE), and product data management (PDM) systems.

In the field of CAD/CAM/CAE/PDM systems, it is often required to insert two-dimensional (2D) annotations into three-dimensional (3D) representations of models. In the 3D representation each annotation, which is usually comprised of a piece of text or label and an arrow linking the text or label to the elements of the model to which the annotation applies, is located in a plane, known as the "annotation plane". The text of an annotation can be a flagnote, e.g., a link to an HTML file, or a tolerance specification, which can be a geometrical tolerance specification (e.g., an indication of position, orientation, form or run-out) or a dimensioning tolerance specification (e.g., 4±0.1). Annotations must comply with industry standards, such as ISO or ASME. For example, a geometrical tolerance specification would be specified, by the standards, to have an appearance as shown in FIG. 1. In FIG. 1 the ⊥ symbol means a perpendicularity tolerance, 0.1 represents the tolerance value, and A (known as the "datum element") references the model element (e.g., a surface) with respect to which the perpendicularity is defined. The leader line, which terminates with an arrow, designates the element to which the tolerance applies.

A problem arises when it becomes necessary to move the arrow for any reason, for example a need to improve its visibility. Care must be taken when moving the arrow to ensure that it continues to point to the correct element of the model. Otherwise the annotation could become difficult to interpret or be rendered meaningless.

In known systems users are left with the responsibility of placing the arrow in an appropriate manner when they move it. The user is not provided with useful help by the system for placing the arrow. When working with 3D models, users often have difficulty determining correct locations for the ends of the arrows.

A related problem arises when the geometry is moved. It must be ensured that the arrow is moved accordingly, while continuing to point to the correct element. In known systems, there is no utility for assisting the user in this regard.

There is therefore a strong demand from users for improved tools to assist the user in positioning and repositioning 2D annotations on 3D models. Such tools would increase the productivity of the user.

SUMMARY OF THE INVENTION

Accordingly, the present invention provides a system, method, and apparatus for providing increased productivity in positioning 2D representations on 3D models.

According to one aspect of the invention, this is accomplished by providing the user with a visual display of the intersection of the surface that is the subject of the annotation, and the plane in which the 2D annotation resides. This is in most cases not a single point but a continuum of points in a straight line or curve on the subject surface. This set of points is called a "trace."

According to an aspect of the invention, the user is provided with a tool for moving the leader line linking the annotation to the surface/geometry. When the user activates the tool, the trace of the surface is displayed, indicating to the user all the possible locations to which the leader line can be moved, so that the user may select any point along the trace.

According to another aspect of the invention, the system monitors the specific context of the annotation, to determine whether or not the trace that has been calculated is valid in terms of the rules pertaining to the annotation. In the event that the context of the annotation would limit the trace, the trace is so limited.

According to another aspect of the invention, when the user creates an annotation, the system, based on the type of annotation, the particulars or rules of the annotation, and the geometry selected as the subject of the annotation, proposes one or more annotation planes for proper placement of the annotation so as to comply with the annotation standard. Similarly, when the user seeks to move the annotation plane of an existing annotation, the system will determine whether the new plane selected by the user is appropriate, and if not, will propose an appropriate annotation plane(s).

DETAILED DESCRIPTION OF THE INVENTION

Figure 2:
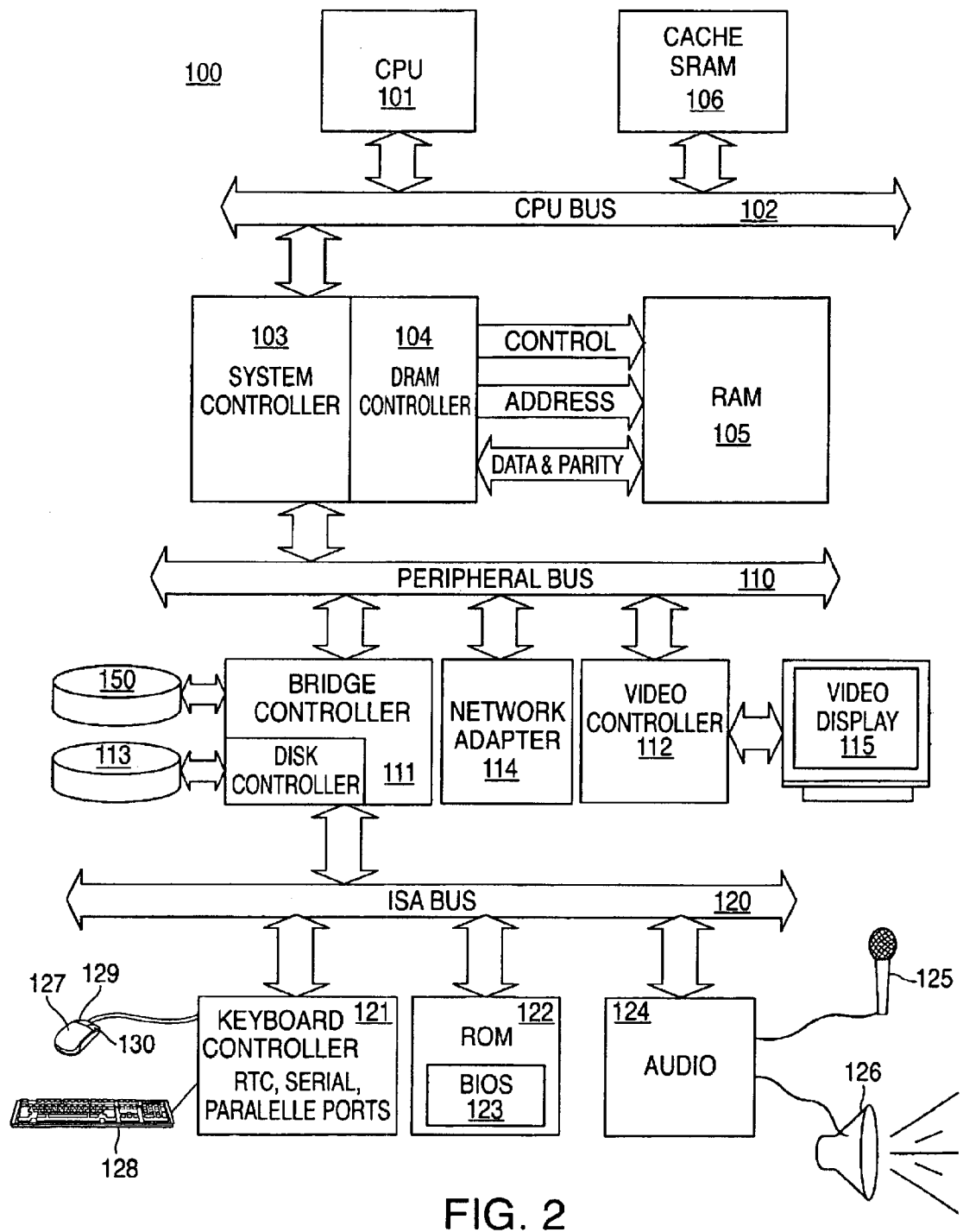
FIG. 2 is a block diagram of a computer system capable of use with the present invention.

Referring to FIG. 2, physical resources of a computer system 100 capable of use in practicing the present invention are depicted. The computer 100 has a central processor 101 connected to a processor host bus 102 over which it provides data, address and control signals. The processors 101 may be any conventional general-purpose single-chip or multi-chip microprocessor such as a Pentium® series processor, a K6 processor, a MIPS® processor, a Power PC® processor or an ALPHA® processor. In addition, the processor 101 may be any conventional special purpose microprocessor such as a digital signal processor or a graphics processor. The microprocessor 101 can have conventional address, data, and control lines coupling it to a processor host bus 102.

The computer 100 can include a system controller 103 having an integrated RAM memory controller 104. The system controller 103 can be connected to the host bus 102 and provide an interface to random access memory 105. The system controller 103 can also provide host bus to peripheral bus bridging functions. The controller 103 can thereby permit signals on the processor host bus 102 to be compatibly exchanged with signals on a primary peripheral bus 110. The peripheral bus 110 may be, for example, a Peripheral Component Interconnect (PCI) bus, an Industry Standard Architecture (ISA) bus, or a Micro-Channel bus. Additionally, the controller 103 can provide data buffering and data transfer rate matching between the host bus 102 and peripheral bus 110. The controller 103 can thereby allow, for example, a processor 101 having a 64-bit 66 MHz interface and a 533 Mbytes/second data transfer rate to interface to a PCI bus 110 having a data path differing in data path bit width, clock speed, or data transfer rate.

Accessory devices including, for example, a hard disk drive control interface 111 coupled to a hard disk drive 113, a video display controller 112 coupled to a video display 115, and a keyboard and mouse controller 121 can be coupled to a bus 120 and controlled by the processor 101. The computer system can include a connection to a computer system network, an intranet or an internet. Data and information may be sent and received over such a connection.

The computer 100 can also include nonvolatile ROM memory 122 to store basic computer software routines. ROM 122 may include alterable memory, such as EEPROM (Electronically Erasable Programmable Read Only Memory), to store configuration data. BIOS routines 123 can be included in ROM 122 and provide basic computer initialization, systems testing, and input/output (I/O) services. The BIOS 123 can also include routines that allow an operating system to be "booted" from the disk 113. Examples of high-level operating systems are, the Microsoft Windows 98™, Windows NT™, UNIX, LINUX, the Apple MacOS™ operating system, or other operating system.

An operating system may be fully loaded in the RAM memory 105 or may include portions in RAM memory 105, disk drive storage 113, or storage at a network location. The operating system can provide functionality to execute software applications, software systems and tools of software systems. Software functionality can access the video display controller 112 and other resources of the computer system 100 to provide models of objects on the video computer display 115.

As stated, a useful purpose of the invention is to identify to the user the set of locations (the locus) that are permissible for the end of the arrow of an annotation, taking into account the meaning of the annotation. To achieve this, the system according to the invention stores a set of data relating to the annotation. The system stores the annotation plane, i.e., the plane in which the annotation is located, and the specific geometry referenced by the annotation, as selected by the user and analyzed by the system.

In addition, the type of annotation is stored. This information is used by the system to more precisely understand the selection of a specific geometry by the user, as the selection made by the user may be ambiguous. For example, the apparent selection of a cylinder may mean, in the user's mind, either the skin of the cylinder or its axis. In this example, if the annotation calls for a certain surface finish tolerance, then the system can determine that the user is focusing not on the axis of the cylinder, but on the condition of its skin.

The system also stores any further indication provided by the user in response to a prompt by the system, e.g., by the opening of a panel of options. This may happen when the previous listed data is not enough to remove all ambiguities.

Figure 1:
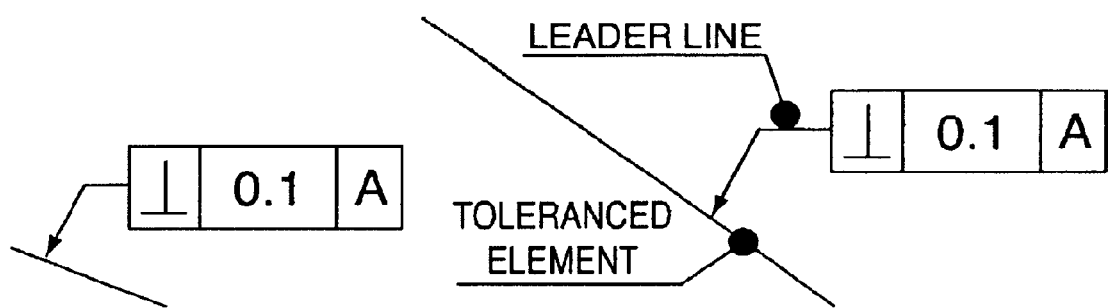
FIG. 1 is an example of an annotation, with a leader line pointing to the element of the geometry to which the annotation applies.

In addition to storing these annotation-related sets of data, the system also stores the standards themselves. That is, for each type of annotation, the system stores the information that is required in all circumstances, namely the elements that must be selected, the type of the annotation, and the indications that are further required. For each standard-defined annotation, the syntax, or spelling, imposed by the standard, i.e., the contents of the three boxes in the FIG. 1 example, and the corresponding semantics, or grammar, i.e., the meaning of these contents, are analyzed and stored in the system. An example list of standards and proposed standards is set forth below.

When the user indicates that he wishes to move the arrow attached or linked to an annotation, the system retrieves the corresponding data, determines the intersection of the specific geometry selected by the user for the annotation with the plane of the annotation, creates the representation of the intersection and identifies to the user (e.g., by a particular form or color of highlighting) the portions of the intersection, called the trace, that are allowed by the standards for locating the end of the annotation arrow. In the preferred embodiment, the trace is created by positioning the cursor over a leader line, and clicking and holding a button on a mouse. The user then moves the leader line by moving the cursor, until the arrow is positioned on the trace in a location preferred by the user. The user then releases the button on the mouse, and the trace disappears. This is shown by way of example in FIGS. 3–6.

Figure 3:
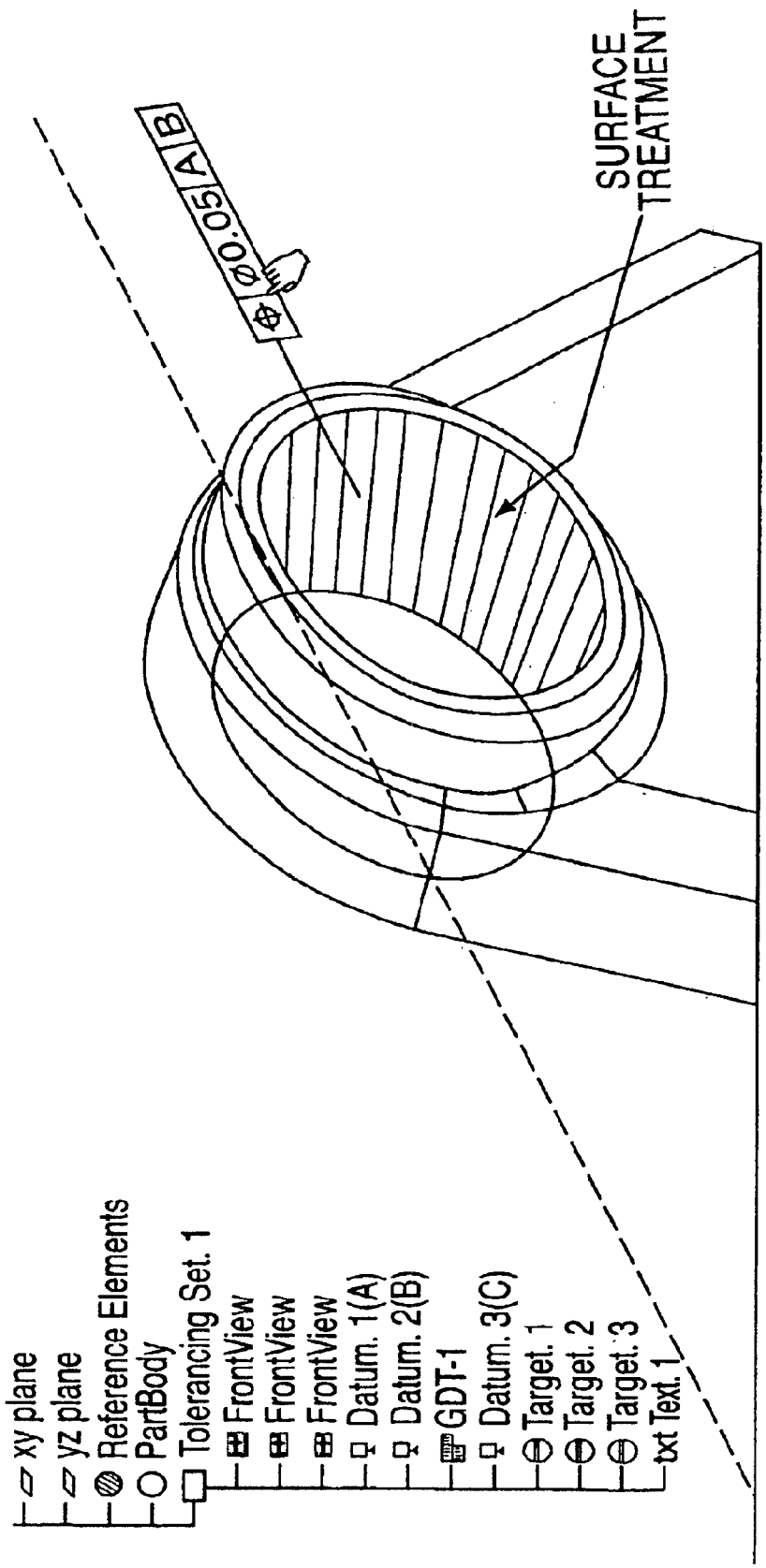
FIG. 3 is a depiction of an object and an annotation, displayed according to the present invention, showing the selection of the annotation.

In FIG. 3, an object is shown with an annotation specifying the tolerance for the axis (centerline) of the bore in the object. FIG. 3 shows the method of the preferred embodiment for selecting the subject annotation, i.e., by positioning a cursor (a hand in the figure) over the annotation and clicking a mouse, or by selecting the annotation from a specification tree. In this case, the annotation is called "GDT.1", and the annotation may be selected by positioning a cursor on the GDT.1 reference of the tree and clicking a mouse.

Figure 4:
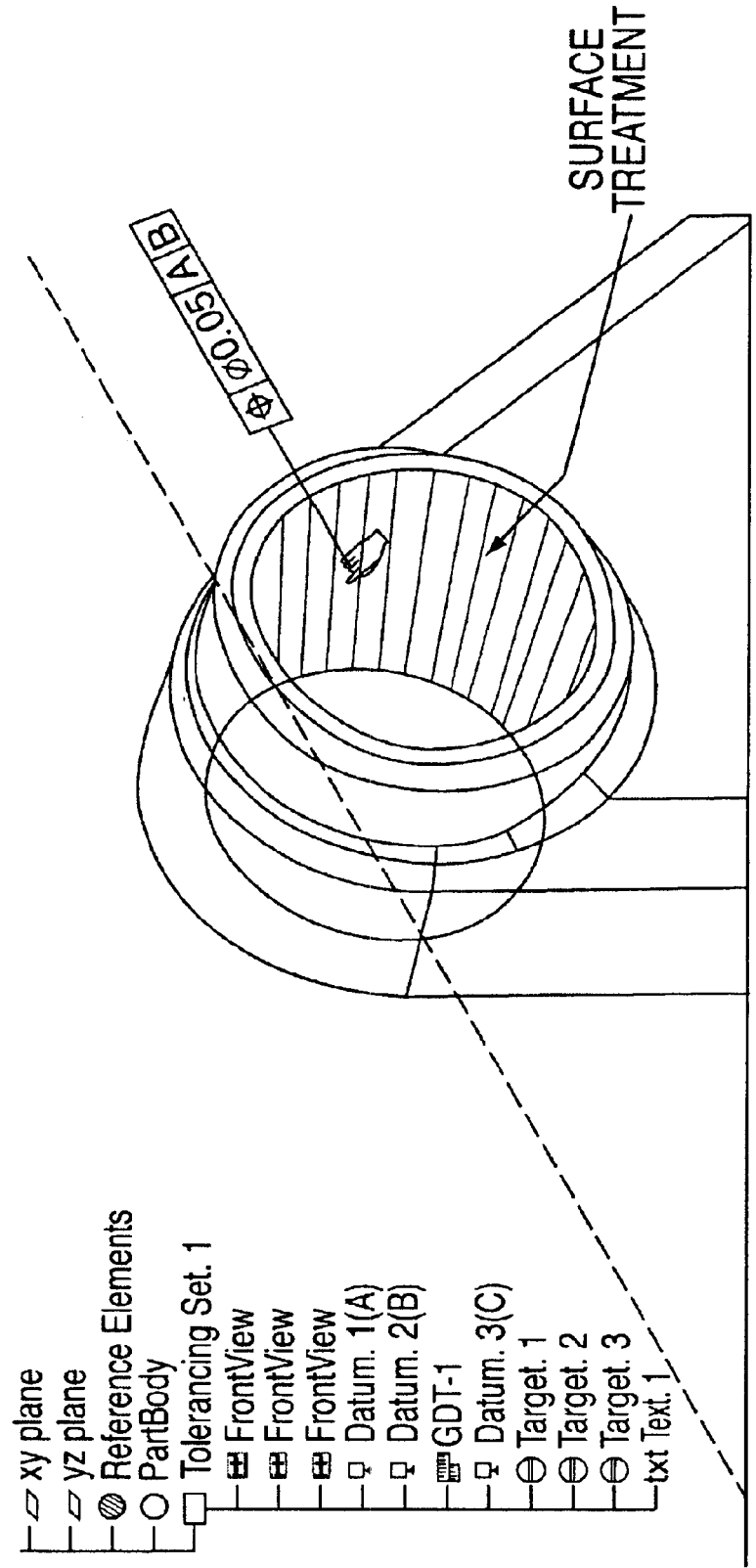
FIG. 4 is a depiction of an object and an annotation, displayed according to the present invention, showing the selection of the leader line, and the highlighting of the associated geometry.

FIG. 4 is a snapshot of the screen of the preferred embodiment as it would appear after the annotation in the example has been selected. In FIG. 4, the geometry that is the subject of the annotation is highlighted with parallel black stripes. Other methods for highlighting the geometry, such as changing its color or highlighting the geometry, could be employed as well.

Figure 5:
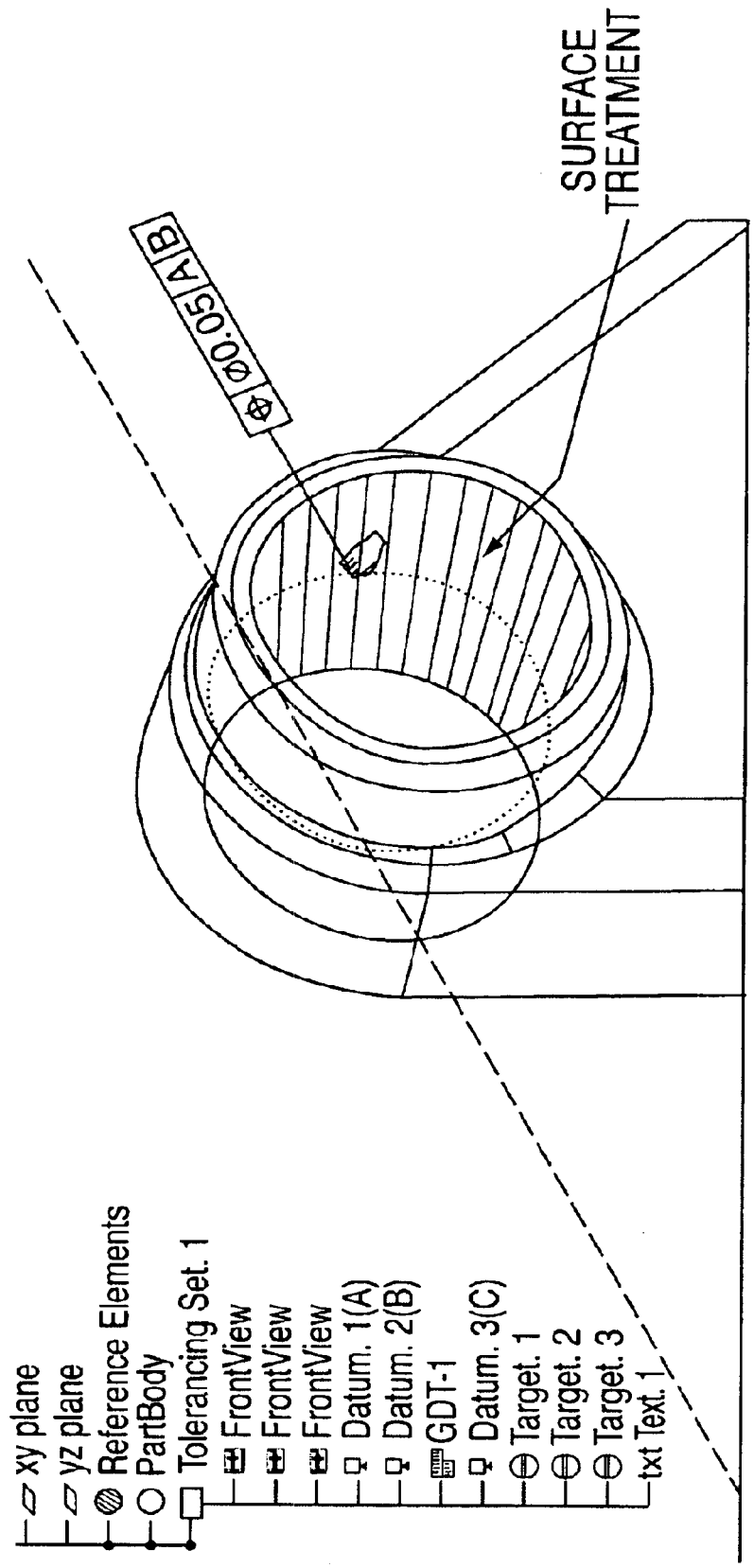
FIG. 5 is a depiction of an object and an annotation, displayed according to the present invention, showing the display of a trace, according to the present invention.
Figure 6:
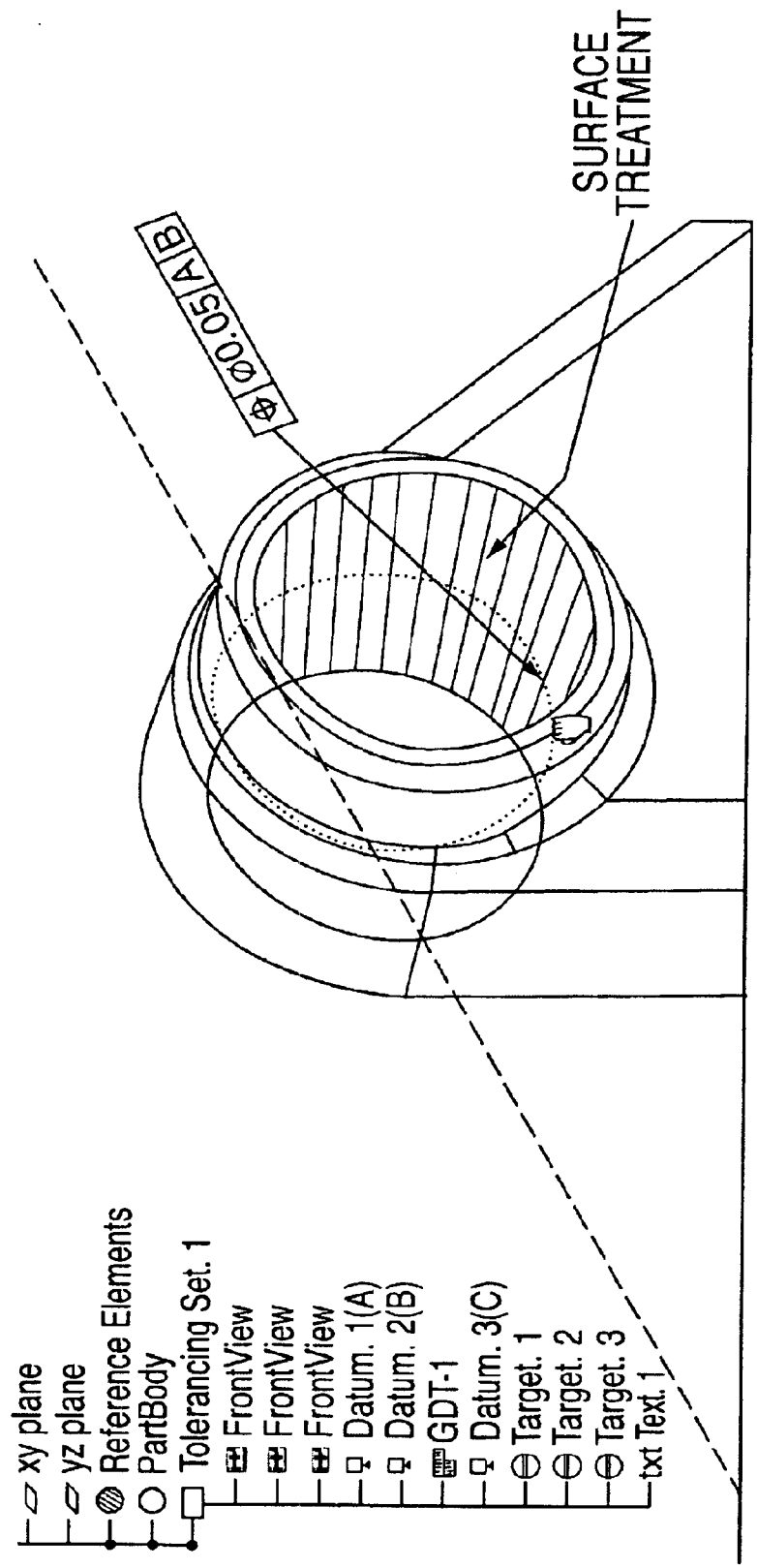
FIG. 6 is a depiction of an object and an annotation, displayed according to the present invention, showing the placement of a leader line on a trace.

FIG. 5 depicts the screen of the preferred embodiment as it would appear after the user has selected the leader line. In the preferred embodiment, the user selects the leader line by positioning the cursor on the leader line and clicking and holding the mouse. When this is done, the system displays the trace, indicating acceptable locations for placement of the arrow of the leader line. This is shown in FIG. 5 by the dotted black line 50. In this example, the trace 50 is the intersection of the toleranced geometry and the annotation plane. In the preferred embodiment, as long as the mouse button remains depressed, the trace is displayed, and moving the mouse moves the position of the leader line. FIG. 6 shows the leader line in place in a new location on the trace.

Figure 7:
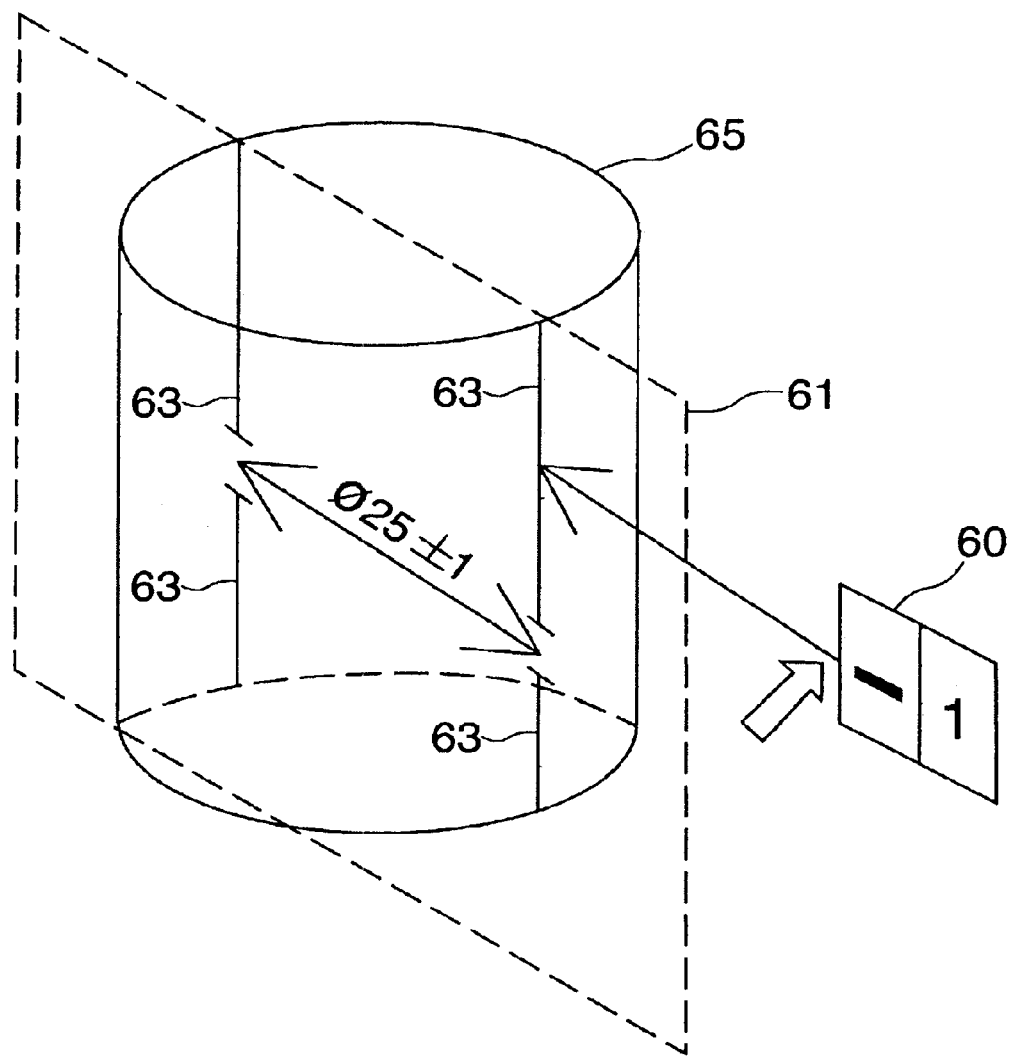
FIG. 7 is a depiction of an object, and two annotations in an annotation plane, showing a trace on the object which is less than the complete intersection of the object and the annotation plane.
Figure 8:
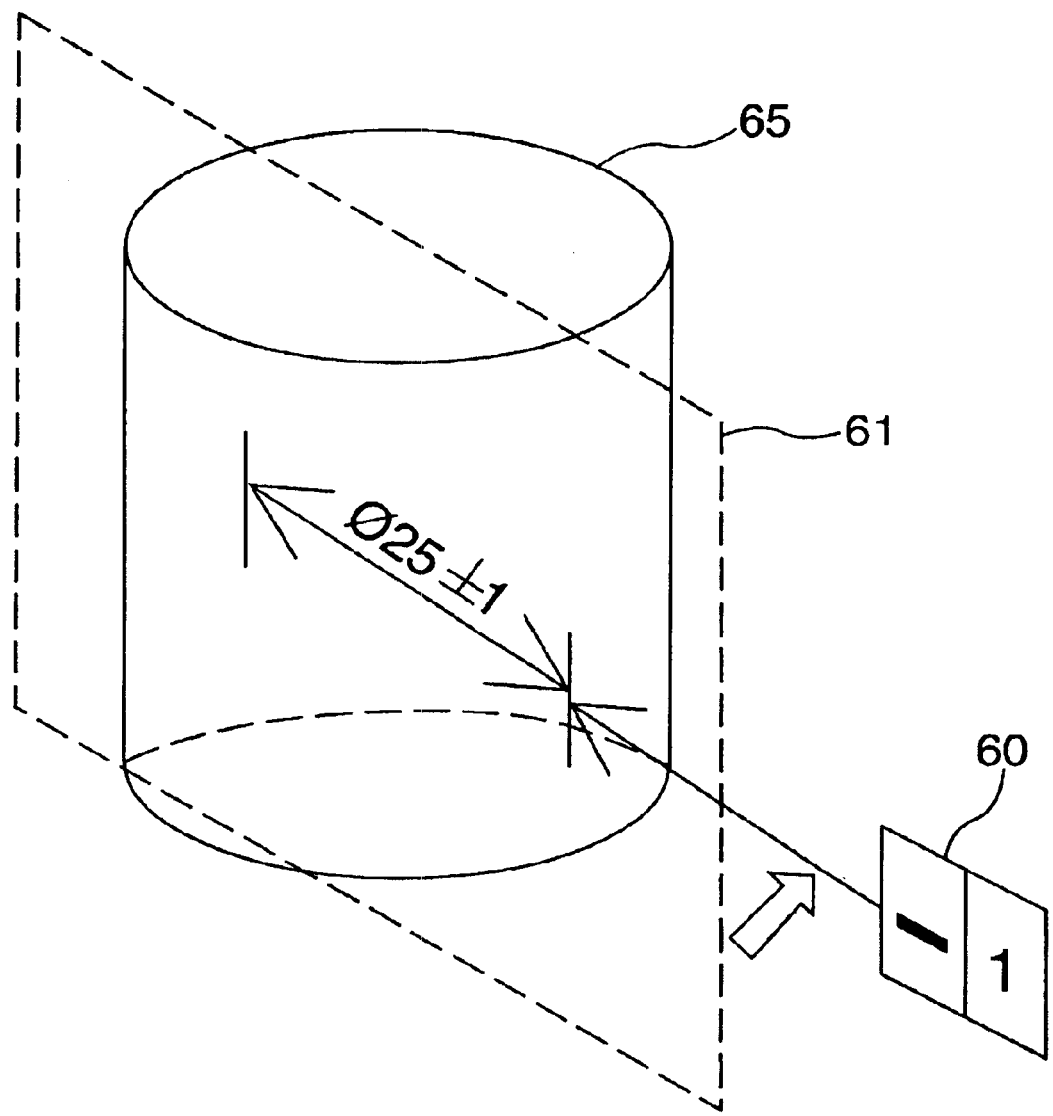
FIG. 8 is a depiction of an object and two annotations in an annotation plane, showing the two annotations aligned.

In some cases, the trace of acceptable locations for the leader line may not be the entire intersection of the geometry with the annotation plane. The trace may be limited by the context of the annotation and the rules of the standard for the annotation. An example of this type of situation is shown in FIGS. 7 and 8. In FIG. 7, the object that is the subject of the design is a cylinder 65. A straightness specification 60, which is a geometric tolerancing specification, lies in the annotation plane 61, depicted by a dashed line. Also depicted in FIG. 7 is a dimensioning specification, i.e., "Ø25±1", which applies to the location of the axis of the cylinder. According to the rules of the specifications, when the two specifications are not aligned, for example as shown in FIG. 7, the straightness specification applies to the surface of the cylinder. However, if the two specifications are aligned, as shown in FIG. 8, the straightness specification applies not to the surface of the cylinder, but to the axis of the cylinder. Therefore, depending on the relative positioning of the specifications, the meaning changes. This is dictated by the specification standards, which are stored in the system.

Accordingly, in the event that the user attempts to move the leader line for the straightness specification in FIG. 7, which applies to the surface of the cylinder, the system will display a trace that is composed of the intersection of the annotation plane and the geometry (the cylinder), minus that portion of the intersection that would align the two specifications. This is shown in FIG. 7 by lines 63, which have a gap at the location of the dimensioning specification. The user is thus informed not to move the leader line to the gap, but only to the displayed trace 63. In the preferred embodiment, the user is prevented from moving the leader line to the gap.

In another aspect of the invention, in the event that two specifications are tied together according to the rules of the specifications, as in the FIG. 8 example, when the user moves one of the specifications, the other moves along with it, so that they remain aligned.

In another feature of the invention, when an object is moved, the configuration between the annotations pertaining to the object and the object remains as it was before the move. All the traces are re-computed after displacement and stay identical. This is shown if FIGS. 9 and 10.

Figure 9:
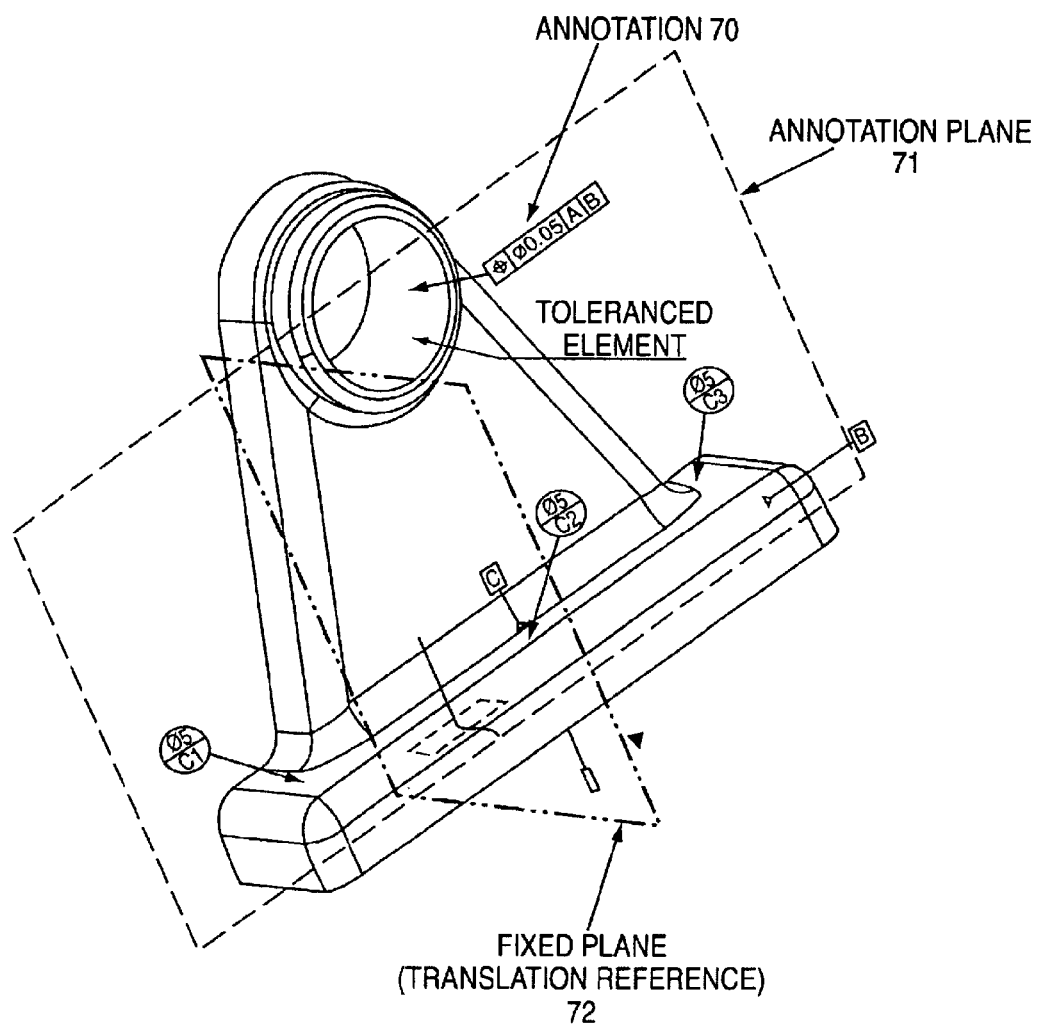
FIG. 9 is a depiction of an object and an annotation positioned with respect to a fixed plane.
Figure 10:
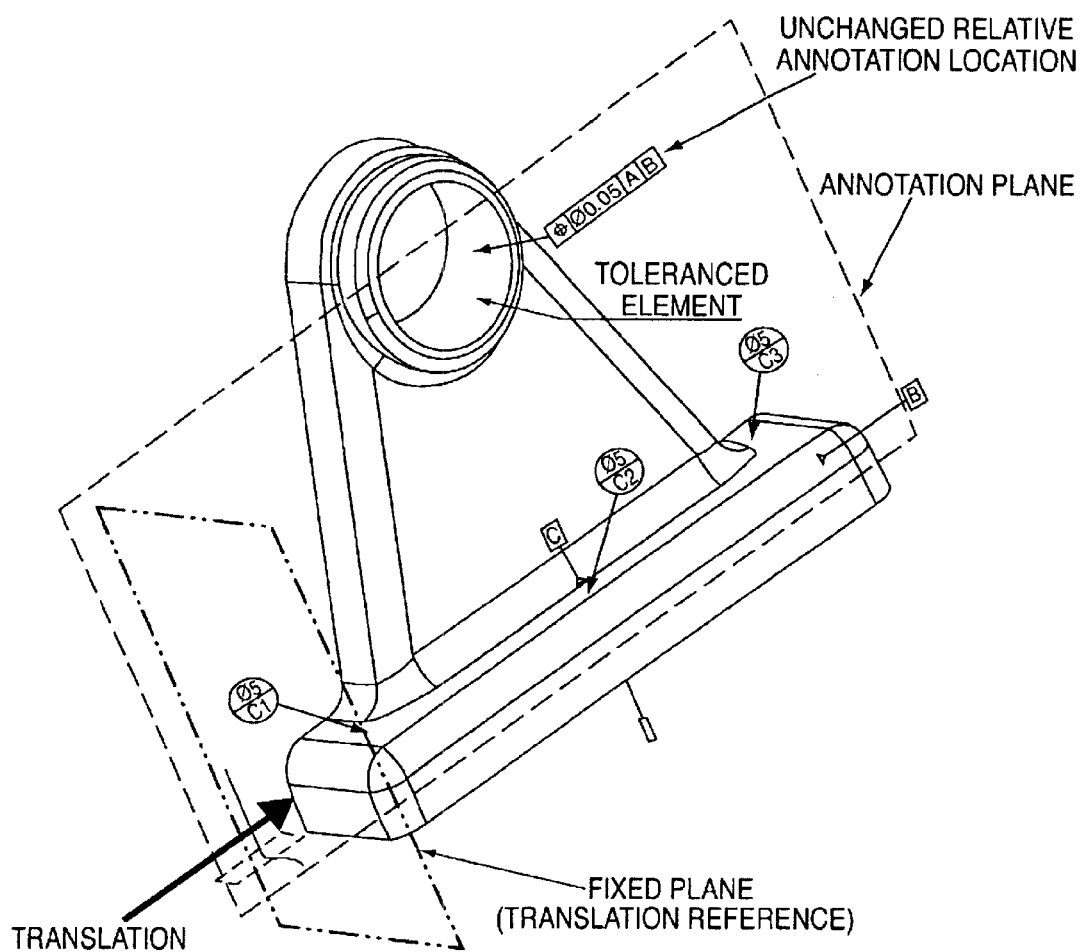
FIG. 10 is a depiction of the object and annotation of FIG. 9, shown in a new location with respect to the fixed plane, and showing that the object and annotation have the same relative position as in FIG. 9.

In FIG. 9 an object is shown, together with a tolerancing specification relating to the axis of the bore in the object. The annotation 70 lies in the annotation plane 71. Also shown, for the purposes of illustration, is a fixed plane 72. In the event that the object is moved with respect to the fixed plane 72, the system determines the new location for the annotation, such that the relative position of the object and the annotation remain unchanged. This is shown in FIG. 10.

As stated, in another aspect of the invention, when the user creates an annotation, the system, based on the type of annotation, the particulars or rules of the annotation, and the geometry selected as the subject of the annotation, proposes one or more annotation planes for proper placement of the annotation so as to comply with the annotation standard. For example, focusing on the example of FIG. 8, as discussed above, the straightness annotation 60, in order to be interpreted properly as applying to the axis of the cylinder, must be in the same plane as the dimensioning specification "Ø25±1", as well as being aligned with it. In the event that the user attempts to place the straightness annotation in a plane that does not comply with these standard-driven rules, the system will inform the user that the annotation cannot be placed in the plane selected by the user. In the preferred embodiment, the system will display annotation plane 61, and suggest to the user that the annotation be place therein.

Similarly, when the user seeks to move the annotation plane of an existing annotation, the system will determine whether the new plane selected by the user is appropriate, and if not, will propose an appropriate annotation plane(s).

The system may also identify to the user, for example by a different sort of highlighting, the three constituents involved in a tolerancing specification: the text, the arrow and, if applicable, the datum i.e. the toleranced element of the model.

The following is an example of a list of applicable standards that would be stored by the system.

American standards and proposed standards in the dimensioning and geometrical tolerancing specification field managed by the ASME (American Society of Mechanical Engineers):

ASME Y14.5M-1994 "Dimensioning and Tolerancing", revision of ANSI Y14.5M-1982, The American Society of Mechanical Engineers, New York, 1994.

ASME Y14.5.1M "Mathematical Definition of Dimensioning and Tolerancing Principles", revision of ANSI Y14.5M-1982, The American Society of Mechanical Engineers, New York, 1994.

ASME Y14.8M "Castings and Forgings", The American Society of Mechanical Engineers, New York, 1989.

ASME Y14.24 "Types and Applications of Engineering Drawings", The American Society of Mechanical Engineers, New York, 1989.

ASME Y14.34M "Associated Lists", The American Society of Mechanical Engineers, New York, 1989.

ASME Y14.35M "Revision of Engineering Drawings and Associated Documents", The American Society of Mechanical Engineers, New York, 1992.

ASME Y14.36M "Surface Texture Symbols", revision of ANSI Y14.36M-1978, The American Society of Mechanical Engineers, New York, 1993.

ASME Y14.38 "Abbreviations and Acronyms", The American Society of Mechanical Engineers, New York.

ASME Y14.100M "Engineering Drawing Practices", The American Society of Mechanical Engineers, New York.

ASME Y14.41 "Product Definition for Digital Data Files", on work standard, The American Society of Mechanical Engineers, New York.

International standards and proposed standards in the dimensioning and geometrical tolerancing specification field managed by the ISO (the International Organization for Standardization):

ISO 129:1985 "Technical drawings—Dimensioning—General principles, definitions, methods of execution and special indications", ISO, 1985.

ISO 286-1:1988 "ISO system of limits and fits—Part 1: Bases of tolerances, deviations and fits", ISO, 1988.

ISO 286-2:1988 "ISO system of limits and fits—Part 2: Tables of standard tolerance grades and limit deviations for holes and shafts", ISO, 1988.

ISO 406:1987 "Technical drawings—Tolerancing of linear and angular dimensions", ISO, 1987.

ISO 1101-2000 "Geometrical Product Specifications (GPS)—Geometrical tolerancing Tolerances of form, orientation, location and run-out", revision of ISO 1101-1983, ISO, 2000.

ISO 1119:1998 "Geometrical Product Specifications (GPS)—Series of conical tapers and taper angles", ISO, 1998.

ISO 1302:2000 "Technical drawings—Method of indicating surface texture", ISO, 2000.

ISO 1660:1987 "Technical drawings—Dimensioning and tolerancing of profiles", ISO, 1987.

ISO 2538:1998 "Geometrical Product Specifications (GPS)—Series of angles and slopes on prisms", ISO, 1998.

ISO 2692:1988 "Technical drawings—Geometrical tolerancing—Maximum material principle", ISO, 1988.

ISO 2692:1988/Amd 1:1992 "Least material requirement", ISO, 1992.

ISO 2768-1:1989 "General tolerances—Part 1: Tolerances for linear and angular dimensions without individual tolerance indications", ISO, 1989.

ISO 2768-2:1989 "General tolerances—Part 2: Geometrical tolerances for features without individual tolerance indications", ISO, 1989.

ISO 3040:1990 "Technical drawings—Dimensioning and tolerancing—Cones", ISO, 1990.

ISO 5458:1998 "Geometrical Product Specifications (GPS)—Geometrical tolerancing Positional tolerancing", ISO, 1998.

ISO 5459:1981 "Technical drawings—Geometrical tolerancing—Datums and datum-systems for geometrical tolerances", ISO, 1981.

ISO/DIS 5459-2:1998 "Geometrical Product Specifications (GPS)—Datums for geometrical tolerancing—Part 2: Datums and datum-system; explanations and indication", Draft International Standard, ISO, 1998.

ISO 8015:1985 "Technical drawings—Fundamental tolerancing principle", ISO, 1985.

ISO 8785:1998 "Geometrical Product Specification (GPS)—Surface imperfections Terms, definitions and parameters", ISO, 1998.

ISO 10578:1992 "Technical drawings—Tolerancing of orientation and location Projected tolerance zone", ISO, 1992.

ISO 10579:1993 "Technical drawings—Dimensioning and tolerancing—Non-rigid parts", ISO, 1993.

ISO 13715:2000 "Technical drawings—Edges of undefined shape—Vocabulary and indications", ISO, 2000.

It is to be understood that the foregoing method can be applied to any system for designing objects, including any CAD/CAM/CAE/PDM system. The invention may be implemented in digital electronic circuitry, or in computer hardware, firmware, software, or in combinations of them. Apparatus of the invention may be implemented in a computer program product tangibly embodied in a machine-readable storage device for execution by a programmable processor; and method steps of the invention may be performed by a programmable processor executing a program of instructions to perform functions of the invention by operating on input data and generating output.

The invention may advantageously be implemented in one or more computer programs that are executable on a programmable system including at least one programmable processor coupled to receive data and instructions form, and to transmit data and instructions to, a data storage system, at least one input device, and at least one output device. The application program may be implemented in a high-level procedural or object-oriented programming language, or in assembly or machine language if desired; and in any case, the language may be a compiled or interpreted language.

Generally, a processor will receive instructions and data from a read-only memory and/or a random access memory. Storage devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks. Any of the foregoing may be supplemented by, or incorporated in, specially designed ASICs (application-specific integrated circuits).

The preferred embodiment of the present invention has been described. It will be understood that various modifications may be made without departing from the spirit and scope of the invention. Therefore, other implementations are within the scope of the following claims.

What is claimed is:

1. A computer system operation method for use with a system for displaying representations of objects, the method comprising:

displaying a representation of an object;

displaying an annotation for the object, said annotation including a leader line connecting the annotation to the object;

receiving input from a user specifying movement of said leader line;

calculating a trace of possible placement points for attachment of the leader line to the object; and displaying said trace.

2. The computer system operation method of claim 1, wherein the method further comprises:

receiving input from a user specifying a new location for the leader line; and displaying the leader line in said new location.

3. The computer system operation method of claim 1, wherein the method by which the user specifies movement of the leader comprises:

placing a cursor over the leader line, clicking a mouse, and moving the cursor to a new location.

4. The computer system operation method of claim 1, wherein said calculation comprises:

retrieving stored data containing standards-based rules pertaining to the type of said annotation; and determining from said data whether the trace should be modified based on said data, and if so, modifying said trace based on said data.

5. A computer system operation method for use with a system for displaying representations of objects, the method comprising:

displaying a representation of an object;

receiving input from a user specifying the placement of an annotation in a given plane with respect to said object;

determining the type of said annotation, and retrieving annotation placement rules information stored in said system pertaining to said type of annotation; and determining from said retrieved information whether the plane chosen by the user for said annotation is consistent with said retrieved information.

6. The computer system operation method of claim 5, the method further comprising:

notifying the user that the chosen plane is not consistent with said retrieved information in the event that the system determines that the plane chosen by the user for said annotation is not consistent with said retrieved information.

7. The computer system operation method of claim 5, the method further comprising:

calculating at least one annotation plane for said annotation consistent with said retrieved information, in the event that the system determines that the plane chosen by the user for said annotation is not consistent with said retrieved information; and displaying said at least one annotation plane.

8. A CAD/CAM apparatus comprising: an input device; a central processing unit; and a display device;
wherein the central processing unit runs an application program comprising code for causing the apparatus to:
display a representation of an object;
display an annotation for the object, said annotation including a leader line connecting the annotation to the object;
receive input from a user specifying movement of said leader;
calculate a trace of possible placement points for attachment of the leader line to the object; and
display said trace.

9. The CAD/CAM apparatus of claim 8, wherein the application program further comprises code for causing the apparatus to:
receive input from a user specifying a new location for the leader line; and display the leader line in said new location.

10. The CAD/CAM apparatus of claim 8, wherein the application program further comprises code allowing the user to specify movement of the leader line by a method comprising:
placing a cursor over the leader line, clicking a mouse, and moving the cursor to a new location.

11. The CAD/CAM apparatus of claim 8, the application program further comprising code for causing the apparatus to:
retrieve stored data containing standards-based rules pertaining to the type of said annotation; and
determine from said data whether the trace should be modified based on said data, and if so, modify said trace based on said data.

12. A CAD/CAM apparatus comprising; an input device; a central processing unit; and a display device;
wherein the central processing unit runs an application program comprising code for causing the apparatus to:
display a representation of an object;
receive input from a user specifying the placement of an annotation in a given plane with respect to said object;
determine the type of said annotation, and retrieve annotation placement rules information stored in said system pertaining to said type of annotation; and
determine from said retrieved information whether the plane chosen by the user for said annotation is consistent with said retrieved information.

13. The CAD/CAM apparatus of claim 12, the application program further comprising code for causing the apparatus to:
notify the user that the chosen plane is not consistent with said retrieved information, in the event that the system determines that the plane chosen by the user for said annotation is not consistent with said retrieved information.

14. The CAD/CAM apparatus of claim 12, the application program comprising code for causing the apparatus to:
calculate at least one annotation plane for said annotation consistent with said retrieved information, in the event that the system determines that the plane chosen by the user for said annotation is not consistent with said retrieved information; and
display said at least one annotation plane.

15. Computer executable code stored on a computer readable medium, the code comprising means for causing a computer to take steps comprising:
displaying a representation of an object;
displaying an annotation for the object, said annotation including a leader line connecting the annotation to the object;
receiving input from a user specifying movement of said leader line;
calculating a trace of possible placement points for attachment of the leader line to the object; and
displaying said trace.

16. Computer executable code stored on a computer readable medium according to claim 15, said code further comprising means for causing a computer to take steps comprising:
receiving input from a user specifying a new location for the leader line; and displaying the leader line in said new location.

17. Computer executable code stored on a computer readable medium according to claim 15, said code further comprising means for causing a computer to take steps comprising:
retrieving stored data containing standards-based rules pertaining to the type of said annotation; and
determining from said data whether the trace should be modified based on said data, and if so, modifying said trace based on said data.

18. Computer executable code stored on a computer readable medium, the code comprising means for causing a computer to take steps comprising:
displaying a representation of an object;
receiving input from a user specifying the placement of an annotation in a given plane with respect to said object;
determining the type of said annotation, and retrieving annotation placement rules information stored in said system pertaining to said type of annotation; and determining from said retrieved information whether the plane chosen by the user for said annotation is consistent with said retrieved information.

19. Computer executable code stored on a computer readable medium according to claim 17, said code further comprising means for causing a computer to take steps comprising:
notifying the user that the chosen plane is not consistent with said retrieved information, in the event that the system determines that the plane chosen by the user for said annotation is not consistent with said retrieved information.

20. Computer executable code stored on a computer readable medium according to claim 18, said code further comprising means for causing a computer to take steps comprising:
calculating at least one annotation plane for said annotation consistent with said retrieved information, in the event that the system determines that the plane chosen by the user for said annotation is not consistent with said retrieved information; and
displaying said at least one annotation plane.

* * * * *